United States Patent
Bernard et al.

(10) Patent No.: US 8,981,032 B2
(45) Date of Patent: Mar. 17, 2015

(54) COMPOSITION CONTAINING A MODIFIED (POLY) ISOCYANATE AND A SOLVENT OF THE ACETAL OR ALIPHATIC KETONE TYPE, AND USE OF SAID COMPOSITION FOR PRODUCING COATINGS

(75) Inventors: Jean-Marie Bernard, Saint Laurent d'Agny (FR); Aurore Jomier, Lyons (FR)

(73) Assignee: Vencorex France, Saint-Priest (FR)

( * ) Notice: Subject to any disclaimer, the term of this patent is extended or adjusted under 35 U.S.C. 154(b) by 1571 days.

(21) Appl. No.: 12/593,086

(22) PCT Filed: Mar. 21, 2008

(86) PCT No.: PCT/EP2008/053446
§ 371 (c)(1),
(2), (4) Date: Jan. 22, 2010

(87) PCT Pub. No.: WO2008/125419
PCT Pub. Date: Oct. 23, 2008

(65) Prior Publication Data
US 2010/0137507 A1    Jun. 3, 2010

(30) Foreign Application Priority Data

Mar. 27, 2007 (FR) .................................. 07 02200
Jul. 26, 2007 (FR) .................................. 07 05472

(51) Int. Cl.
*C08G 18/00* (2006.01)
*C08G 18/79* (2006.01)
*C08G 18/28* (2006.01)
*C09D 175/04* (2006.01)

(52) U.S. Cl.
CPC .......... *C08G 18/792* (2013.01); *C08G 18/2815* (2013.01); *C09D 175/04* (2013.01)
USPC .......................................................... 528/44

(58) Field of Classification Search
USPC .......................................................... 528/44
See application file for complete search history.

(56) References Cited

U.S. PATENT DOCUMENTS

| | | | |
|---|---|---|---|
| 2003/0064227 A1 | 4/2003 | Gam | |
| 2004/0073046 A1* | 4/2004 | Bernard | 549/228 |
| 2005/0020766 A1* | 1/2005 | Rosen et al. | 524/589 |

FOREIGN PATENT DOCUMENTS

| | | |
|---|---|---|
| EP | 1279520 | 1/2003 |
| EP | 1382626 | 1/2004 |

* cited by examiner

Primary Examiner — Ling Choi
Assistant Examiner — Thuy-Ai Nguyen
(74) Attorney, Agent, or Firm — Michael B. Fein, Esq.; Eckert Seamans Cherin & Mellott, LLC

(57) ABSTRACT

The invention relates to a modified (poly)isocyanate composition that contains a modified (poly)isocyanate and at least one solvent. The invention also relates to the use of this composition for preparing coatings such as paints and varnishes.

26 Claims, No Drawings

COMPOSITION CONTAINING A MODIFIED (POLY) ISOCYANATE AND A SOLVENT OF THE ACETAL OR ALIPHATIC KETONE TYPE, AND USE OF SAID COMPOSITION FOR PRODUCING COATINGS

CROSS-REFERENCE TO RELATED APPLICATIONS

The present application is a 35 U.S.C. 371 National Stage Application of International Application No. PCT/EP2008/053446, International Filing Date: Mar. 28, 2008, which claims priority under 35 U.S.C. §119(a) to France Application No. 07 02200, Filing Date: Mar. 27, 2007 and France Application No. 07 05472, Filing Date: Jul. 26, 2007, each of which are incorporated herein by reference in its entirety.

The present invention relates to a composition based on modified (poly)isocyanate, comprising a modified (poly)isocyanate and at least one solvent. The invention relates also to the use of the composition in the preparation of coatings such as paints or varnishes.

It is known that diisocyanates, especially alkylene diisocyanates and their derivatives of the biuret type or their trimers, are widely used in the field of paints and varnishes.

Until recently, such products were generally used in solution in organic solvents. Today, given the toxicity of some organic solvents, attempts are being made also to develop techniques which employ only a small amount of solvent or are even solvent-free. Accordingly, polyisocyanate-based compositions which are both readily emulsifiable and easy to use as an emulsion in water have been developed. The water in this case serves as the vehicle for the components of the formulation and allows its organic solvent content to be reduced. Furthermore, such compositions allow the equipment used for their application to be rinsed with water.

In addition, for the preparation of polyurethanes which are used as coatings of all kinds, especially those on textiles, glasses, papers, metals, building materials and paints, and which are generally obtained by reacting polyisocyanates with particular nucleophilic co-reagents, it is desired to develop alternatives to isocyanate chemistry, especially because of the irritant and even toxic nature of monomeric isocyanates.

To that end it is known to use modified (poly)isocyanates comprising at least one isocyanate functional group modified by a group having a crosslinking functionality, such as a cyclic carbonate group. The modified (poly)isocyanates are then condensed and crosslinked by reaction with suitable nucleophilic co-reagents (for example amines) to form polyurethanes.

In order for such modified (poly)isocyanates to be readily transported and handled, or in order to lower their viscosity so that they can more easily be atomized, it is desirable to formulate them in a solvent, for example by solubilization. It has been observed, however, that such modified (poly)isocyanates, in particular hexamethylene diisocyanate derivatives, are not readily soluble in the solvents that are conventionally used to formulate polyisocyanate derivatives, such as n-butyl acetate, aromatic alkyl compounds such as Solvesso 100®.

In order to remedy those disadvantages, the invention proposes, as a first object, a composition based on modified (poly)isocyanate, comprising:

at least one modified (poly)isocyanate of formula (I) below:

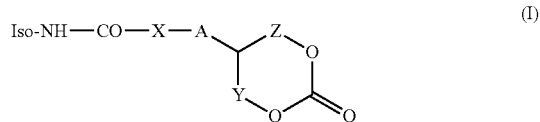

wherein:
Iso is the residue of a (poly)isocyanate (after conversion of an isocyanate functional group);
X represents an atom or a group of atoms which has reacted with the isocyanate functional group;
A represents a single covalent bond or a linear, branched or cyclic hydrocarbon chain containing from 1 to 30, advantageously from 1 to 18 and preferably from 1 to 5 carbon atoms;
Y represents a single covalent bond or a hydrocarbon chain as defined for A;
Z represents a single covalent bond or a hydrocarbon chain as defined for A;
with the proviso that the groups Z and Y do not simultaneously represent a bond;
A and Y, when one and/or the other does not represent a bond, can be joined by way of a divalent radical -Q-, wherein Q represents a linear, branched or cyclic hydrocarbon chain containing from 1 to 30, advantageously from 1 to 18 and preferably from 1 to 5 carbon atoms;
Y and Z, when one and/or the other does not represent a bond, can be joined by way of a divalent radical —W—, wherein W represents a linear, branched or cyclic hydrocarbon chain containing from 1 to 30, advantageously from 1 to 18 and preferably from 1 to 5 carbon atoms;

and
at least one solvent selected from:
a) a solvent of formula (II) below:

wherein:
$R_1$ represents a linear or branched $C_1$-$C_4$-alkyl group, it being possible for the two radicals $R_1$ to be identical or different and also to be joined, preferably by way of a linear or branched hydrocarbon chain containing from 1 to 6 carbon atoms;
$R_2$ represents H or a linear or branched $C_1$-$C_4$-alkyl group;
$R_4$ represents a single covalent bond or a linear or branched hydrocarbon chain containing from 1 to 6 carbon atoms, preferably alkyl;
$R_3$ represents H, $C(OR_1)_2R_2$, $C(O)OR_1$, $OC(O)R_2$, $OC(O)OR_1$; and
b) a solvent selected from the (cyclo)aliphatic ketones and the lactones.

Advantageously, the solvent is a solvent of formula (II) or a (cyclo)aliphatic ketone.

A hydrocarbon chain is understood as being a chain containing carbon and hydrogen atoms and optionally one or more heteroatoms (such as O, S, Si, etc.) and/or heterogroups (such as —NH, —N(substituted)), said chain being optionally substituted by one or more groups selected especially from aryl, cycloalkyl, heteroalkyl, halogen (especially fluorine), a halogenated (especially fluorinated) or perhalogenated (especially perfluorinated) linear or branched hydrocarbon chain, a carboxyl group, a primary or secondary amino group, $NO_2$ and CN. The hydrocarbon chain can be linear or branched or even cyclic. It can be saturated or unsaturated, that is to say can contain one or more double and/or triple bond(s). Mention may be made especially of the alkylene chains and in particular polymethylene —$(CH_2)_n$—, n generally being from 1 to 12, substituted or unsubstituted by groups as defined above.

According to a particular embodiment of the invention, —X— is selected from the following groups:

—O—;
—S—;
—N(R)—, wherein R represents a hydrogen atom or a hydrocarbon chain generally having from 1 to 12 atoms, preferably from 1 to 5 carbon atoms, which can contain one or more heteroatoms and can be substituted;

wherein R' represents a hydrocarbon chain generally having from 1 to 12 atoms, preferably from 1 to 5 carbon atoms, which can contain one or more heteroatoms, such as O, S, Si, or heterogroups, such as —N═, —NR— (R being as defined hereinbefore), and which can be substituted, the chain R' forming with N a nitrogenous, advantageously polynitrogenous, preferably dinitrogenous ring, such as a piperazino ring;
—CO—N(R)—;
—N(R)—C(O)O—;
—C(O)O—;

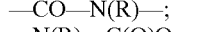

wherein $R_5$ represents a hydrocarbon radical generally having from 1 to 12 atoms, preferably from 1 to 5 carbon atoms, which can contain one or more heteroatoms, such as O, S, Si, or heterogroups, such as —N═, —NR— (R being as defined hereinbefore),

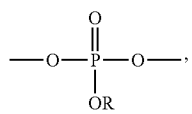

wherein R is as defined hereinbefore,

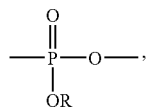

wherein R is as defined hereinbefore, and
—NH—C(═O)—N(R)—, R being as defined hereinbefore.

Advantageously, in the (poly)isocyanate according to the invention, at least one, advantageously two, more particularly three, preferably all of the following conditions are met:
X represents an oxygen atom,
A represents a group —$CH_2$—,
Y represents —$CH_2$—,
Z represents a bond or —$CH_2$—, preferably a bond,
A is not joined to Y and Z is not joined to Y.

According to a very particularly preferred embodiment, the modified (poly)isocyanate according to the invention has the formula below:

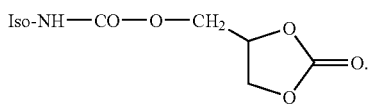

The modified (poly)isocyanate can further comprise at least one other free isocyanate functional group.

The modified (poly)isocyanates can be obtained from mono-, di- or even poly-isocyanates.

Advantageously, they are obtained from isocyanates selected from the following list:
diisocyanates,
polyisocyanates containing at least one isocyanurate group, also called trimers,
polyisocyanates containing at least one uretidinedione group, also called dimers,
polyisocyanates containing at least one biuret group,
polyisocyanates containing at least one carbamate group,
polyisocyanates containing at least one allophanate group,
polyisocyanates containing at least one ester group,
polyisocyanates containing at least one amide group,
polyisocyanates containing at least one urea functional group,
polyisocyanates containing at least one iminocyclooxadiazinedione functional group,
polyisocyanates containing at least one cyclooxadiazinetrione functional group, and
polyisocyanates containing a combination of one or more groups which have just been mentioned, in particular an isocyanurate group.

The isocyanates listed above can also be partially or completely masked, with the exception of the isocyanate functional group modified as indicated above.

Advantageously, the isocyanate is hexamethylene diisocyanate.

The isocyanates can be aliphatic, cycloaliphatic and arylaliphatic or aromatic.

The preferred polyisocyanates are selected from the homo- or hetero-condensation products of alkylene diisocyanate, comprising especially products of the "biuret" type or of the "trimer" type, or even "prepolymers" having an isocyanate functional group, comprising especially urea, urethane, allophanate, ester, amide, acylurea, isocyanurate, oxadiazinetrione, imino-dimer, imino-trimer (iminotriazinedione), imino-oxadiazinedione (also called asymmetric trimer), diazetidinedione (also called dimer) functional groups, and from mixtures containing them.

The polyisocyanate compounds can also contain true carbamate functional groups (R—O—C(═O)—$NH_2$) or epoxy functional groups or carbonate functional groups, preferably cyclic carbonate functional groups.

They can be, for example, the polyisocyanates marketed by Rhodia under the name "Tolonate®".

Generally, preferred polyisocyanates are the homo- or hetero-condensation products of the following aliphatic, (cyclo- or aryl-)aliphatic isocyanate monomers:

1,6-hexamethylene diisocyanate (HDI),
1,12-dodecane diisocyanate,
cyclobutane-1,3-diisocyanate,
cyclohexane-1,3- and/or -1,4-diisocyanate,
1-isocyanato-3,3,5-trimethyl-5-diisocyanatomethylcyclohexane (isophorone diisocyanate, IPDI),
the isocyanatomethyloctylene diisocyanates (TTI), especially 4-isocyanatomethyl-1,8-octylene diisocyanate,
2,4- and/or 2,6-hexahydrotoluylene diisocyanate ($H_6$TDI),
hexahydro-1,3- and/or -1,4-phenylene diisocyanate,
perhydro-2,4'- and/or -4,4'-diphenylmethane diisocyanate ($H_{12}$MDI), and generally the aminated aromatic precursors or perhydrogenated carbamates,
the bis-isocyanatomethylcyclohexanes (especially 1,3 and 1,4) (BIC),
the bis-isocyanatomethylnorbornanes (NBDI),
2-methylpentamethylene diisocyanate (MPDI),
the tetramethylxylylene diisocyanates (TMXDI), and
the derivatives, especially esters, of lysine di- or tri-isocyanate (LDI or LTI).

The homo-condensation products are the products resulting from the condensation of one of the isocyanate monomers mentioned in the list above with itself. The hetero-condensation products are the products resulting from the condensation of two or more of the monomers mentioned in the list above, which monomers may be identical or different, with themselves and/or optionally with one or more compounds having mobile hydrogen, such as, for example, an alcohol, a diol, a primary or secondary amine, a polyol, especially polyester and/or polyether having free hydroxyl functional groups, and other analogous compounds.

The polyisocyanates contained in the composition of the present invention can also be polyisocyanate derivatives obtained from aromatic isocyanates used on their own or in a mixture with aliphatic isocyanate compounds.

The following may be mentioned as examples of aromatic isocyanates, without implying any limitation:
2,4- and/or 2,6-toluylene diisocyanate,
diphenylmethane-2,4'- and/or -4,4'-diisocyanate (MDI),
1,3- and/or 1,4-phenylene diisocyanate,
triphenylmethane-4,4',4''-triisocyanate, and
the oligomers of MDI or TDI.

Mixtures of those (cyclo)aliphatic and/or aromatic polyisocyanates can also be used.

According to a particular embodiment of the invention, the composition comprises a polyisocyanate which is the product of the homocondensation of isocyanates selected from HDI and IPDI or which is derived from a mixture of such homocondensation products.

In the modified (poly)isocyanate of the invention, at least some of the isocyanate functional groups, advantageously at least 50% of the isocyanate functional groups, preferably at least 75% of the isocyanate functional groups, are modified by a compound of the general formula (III):

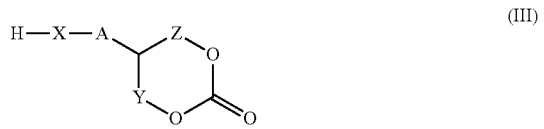

(III)

wherein X, A, Y and Z are as defined above.

The compound of formula (III) contains a crosslinking group. A "crosslinking group" is understood as being a group which, under suitable conditions, is capable of freeing a functional group which in turn is capable of reacting with a reactive functional group to lead especially to a crosslinking reaction. By contrast, the "crosslinking group" does not free a functional group under the conditions for crosslinking of the isocyanate functional group with which the compound (III) that carries the crosslinking group has reacted.

The compound of formula (III) is advantageously glycerol carbonate, corresponding to the formula below:

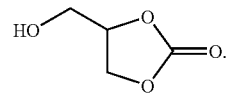

It can also be fatty acid carbonates or their esters, such as the 8,9-carbonate of oleic acid.

The composition of the invention also comprises, in addition to the modified (poly)isocyanate, a solvent of formula (II) described above or a solvent selected from the (cyclo) aliphatic ketones and the lactones, such as the butyrolactones or ε-caprolactone.

More particular embodiments in terms of the nature of the solvent of formula (II) will be described hereinbelow.

It will be noted first of all that the radicals $R_1$ can optionally be joined so as to form bridges of the dioxolane or dioxane type.

$R_4$ can be an alkylene radical having from 1 to 6 carbon atoms, preferably from 1 to 4 carbon atoms. The alkylene radical can optionally be substituted so as to comprise ketone, ester or ether groups, for example.

The solvent of formula (II) advantageously contains not more than 20 carbon atoms and it can have a melting point of not more than 0° C. and a boiling point of not more than 350° C.

The solvent can correspond more particularly to formula (II) wherein $R_2$ represents H or $CH_3$, $R_4$ represents a single covalent bond or a linear alkylene radical containing 1, 2 or 3 carbon atom(s), and $R_3$ represents H, —(CH)(OR$_1$)$_2$ or —C(=O)(OR$_1$).

Yet more particularly, the solvent can correspond to formula (II) wherein $R_2$ represents H or $CH_3$, $R_4$ represents a linear alkylene radical containing 1, 2 or 3 carbon atom(s), preferably $R_4$ represents methylene, and $R_3$ represents H, or wherein $R_2$ represents H or $CH_3$, $R_4$ represents a covalent bond and $R_3$ represents —(CH)(OR$_1$)$_2$ or —C(=O)(OR$_1$).

According to a particular embodiment, the solvent can be selected more particularly from those of formula (II) wherein the groups $R_1$ can be methyl or ethyl radicals, $R_4$ is a covalent bond and $R_2$ is hydrogen. In the case of this embodiment, the solvent can correspond more particularly to formula (II) wherein $R_2$ represents H, $R_4$ is a covalent bond, $R_3$ represents —(CH)(OR$_1$)$_2$ and $R_1$ represents an ethyl radical, the solvent then being 1,1,2,2-tetraethoxyethane. In the case of this same embodiment, the solvent can also correspond more particularly to formula (II) wherein $R_2$ represents H, $R_4$ is a covalent bond, $R_3$ represents —C(=O)(OR$_1$) and $R_1$ represents an ethyl radical, the solvent then being ethyl 2,2-diethoxyacetate. The solvent can also correspond to formula (II) wherein $R_2$ represents H, $R_4$ is a covalent bond, $R_3$ represents —C(=O)(OR$_1$) and $R_1$ represents a methyl radical, the solvent then being methyl 2,2-dimethoxyacetate.

According to a preferred embodiment, the solvent corresponds to formula (II) wherein $R_2$ represents H, $R_4$ is a covalent bond, $R_3$ represents —(CH)(OR$_1$)$_2$ and $R_1$ represents a methyl radical, the solvent then being 1,1,2,2-tetramethoxyethane.

The latter solvent constitutes an advantageous variant because 1,1,2,2-tetramethoxyethane is a non-flammable, non-toxic product with a weak odour. It is also miscible with water in any proportions.

The solvents of formula (II) used within the scope of the invention and which have just been described are known products. Reference may be made especially to the teaching of FR-A-2855171.

When a solvent selected from the aliphatic ketones is used in the composition of the invention, the solvent is advantageously methyl ethyl ketone (MEK), methyl isobutyl ketone (MIBK) or methyl amyl ketone (MAK).

Of course, the invention covers cases in which the composition comprises a plurality of solvents. Such solvents can be a mixture of solvents according to formula (II) and/or of solvents which are (cyclo)aliphatic ketones and/or of solvents which are lactones. It can also be a combination of at least one solvent of formula (II) and/or at least one aliphatic ketone solvent and/or at least one lactone solvent with one or more other solvents which are known and are used for this type of composition, for example butyl acetate, methoxypropyl acetate, propylene glycol diacetate, butylethylene glycol acetate, dimethyl dipropylene glycol, carbonic acid esters, such as propylene carbonate, ethyl ethoxypropionate, N-ethylpyrrolidone. However, such solvents are preferably selected from those which are non-flammable, non-toxic and have a weak odour.

There is preferably used a solvent having a boiling point of from 50° C. to 350° C., more particularly from 75° C. to 300° C.

The solvents used in the compositions of the invention make it possible to confer thereon a suitable viscosity in dependence on the intended type of application, as well as good transportation and handling of the modified (poly)isocyanates of the invention.

The proportion of modified (poly)isocyanate in the composition of the invention varies in dependence on the application and is generally from 5% to 75%; it is more particularly from 5% to 50% and yet more particularly from 5% to 30% by weight, based on the weight of the composition.

It will be noted that, in the case of a mixture of one or more solvents according to the invention with one or more of the known solvents mentioned above, the proportion of solvent according to the invention is advantageously at least 50% by mass, based on total solvents, preferably at least 75%, yet more preferably at least 90%; the overall proportion in the total solvents then remaining within the range given in the preceding paragraph.

The invention relates, as a second object, to a process for the preparation of the composition of the invention, comprising the following steps:
reacting an isocyanate, optionally a polyisocyanate and/or an isocyanate containing a group selected from the groups carbamate, urea, biuret, uretidinedione, isocyanurate, urethane and allophanate, with a compound of the general formula (III), and with optionally at least one polyol selected from the polyesters and/or polyethers, in the presence of the solvent of the general formula (II) and/or of the (cyclo)aliphatic ketone solvent and/or of the lactone solvent, and
optionally isolating the resulting product.

All that has been described above in relation to the isocyanates of the composition of the invention applies identically to the process of the invention.

When X in the compound of the general formula (III) represents an oxygen or sulfur atom, the composition of the invention can be obtained by condensation of the isocyanate compounds that are to be modified with the compound of the general formula (III) as defined hereinbefore wherein X represents O or S, with heating, optionally in the presence of a catalyst, and in the presence of the solvent of the general formula (II) and/or of the (cyclo)aliphatic ketone solvent and/or of the lactone solvent.

When X in the compound of the general formula (III) represents a group NR as defined above, the composition of the invention can be obtained by condensation with an isocyanate compound at ambient temperature or with heating, in the presence of the solvent of the general formula (II) and/or of the (cyclo)aliphatic ketone solvent and/or of the lactone solvent.

The compound of the general formula (III) can be brought into contact with the solvent of the general formula (II) and/or with the (cyclo)aliphatic ketone solvent and/or the lactone solvent before the reaction with the isocyanate. The advantage of the solvent of the invention is that it is a solvent for the compound of the general formula (III), which is not generally the case with the conventional solvents used with isocyanates, such as, for example, n-butyl acetate. That is true in particular when the compound of formula (III) is glycerol carbonate.

The isocyanate can also be brought into contact with the solvent of the general formula (II) and/or with the (cyclo) aliphatic ketone solvent and/or the lactone solvent before the reaction with the compound of the general formula (III). The solvent of the invention is a solvent for the isocyanate.

The compound of formula (III) can be brought into contact with the isocyanate, and the mixture so formed is then brought into contact with the solvent of the invention.

According to a particular embodiment of the invention, the process comprises a step of mixing at least one modified (poly)isocyanate with at least one solvent of the invention. Any mixing method known to the person skilled in the art can be used to carry out the process of the invention. The advantage of the solvent of the invention is that it permits good solubilization of the modified (poly)isocyanate of the invention, which allows the latter to be handled and transported easily. The solvent of the invention can also be an advantage for the final formulation of the modified (poly)isocyanate, especially for paint formulations, because the solvent has a weak odour.

The invention relates, as a third object, to a composition comprising:
the compound of the general formula (III) as defined above; and
at least one solvent selected from:
a) a solvent of formula (II) below:

(II)

wherein:
$R_1$ represents a linear or branched $C_1$-$C_4$-alkyl group, it being possible for the two radicals $R_1$ to be identical or different and also to be joined, preferably by way of a linear or branched hydrocarbon chain containing from 1 to 6 carbon atoms;
$R_2$ represents H or a linear or branched $C_1$-$C_4$-alkyl group;

R₄ represents a single covalent bond or a linear or branched hydrocarbon chain containing from 1 to 6 carbon atoms, preferably alkyl;

R₃ represents H, C(OR₁)₂R₂, C(O)OR₁, OC(O)R₂, OC(O)OR₁; and b) a solvent selected from the (cyclo)aliphatic ketones and the lactones.

As indicated above, the advantage of the solvent of the invention is that it is a solvent for the compound of the general formula (III). This especially allows it to be used with isocyanates, for which the solvent of the invention is also a solvent. When the compound of the general formula (III) is used in a reaction with isocyanates to prepare the modified (poly)isocyanate of the invention, the same solvent of the invention used for the compound of the general formula (III) also permits solubilization of the final modified (poly)isocyanate that is obtained, which is an advantage.

Any free isocyanate functional groups of the modified (poly)isocyanate of the invention can form, by condensation with groups having mobile hydrogen NuH, especially polyols, or polyamines or polysulfhydryls, prepolymers having pendant carbonate functional groups and terminal free isocyanate functional groups or alcohols or amines or sulfhydryls depending on the ratio NCO/NuH, NuH being as defined above.

After opening of the crosslinking group with a suitable reactive agent, the prepolymer so obtained can subsequently be crosslinked.

The functional groups that react with the crosslinking group of the modified (poly)isocyanate of the invention are the functional groups alcohols, primary or secondary amines, nitrogenous heterocyclic compounds having a reactive hydrogen atom, oximes or phenols, preferably phenates or carboxylates.

There will preferably be chosen ammonia, primary or secondary amines or nitrogenous heterocycles, for example guanidines or their salts, which act by opening the ring.

In order to obtain polyurethane networks or films, the prepolymers can be reacted with amines, preferably di- or polyamines, preferably primary or secondary. Networks having pendant hydroxyl functional groups are thus obtained, and they can either be self-crosslinked with the NCOs present in the medium, or allow grafting or permit a crosslinking reaction with mixtures that are reactive with those functional groups.

One of the many advantages of the composition according to the invention is that it can serve as a base for the preparation of polymers and/or crosslinked products which can be used, for example, as the main constituents of coatings of all kinds, such as paints or varnishes. In such uses, the hardness properties of the crosslinkable polymers are among the properties which are desirable from the technical and functional point of view.

Accordingly, as a fourth object, the invention relates to the use of the composition of the invention in the preparation of non-expanded coatings, especially paints, varnishes or adhesives.

A coating is understood as being any type of layer applied to a substrate in order to protect and/or decorate it, for example a paint or a varnish.

The process is carried out by applying the composition of the invention to the substrate by any known technique.

In the case of aqueous formulations, the composition of the invention can be emulsified by means of various compounds such as surfactants or polyols having an emulsifiable nature, or can be rendered water-soluble by the grafting of non-ionic functional groups such as polyalkylene oxide or of acidic ionic functional groups, such as those of parahydroxybenzoic acid (PHBA), dimethylolpropionic acid, sulfonic acid, sulfamic acid and phosphoric derivatives or basic ionic functional groups, such as N,N-dialkylhydroxylalkylamines, especially N,N-dimethylethanolamine or guanidine derivatives.

The grafting can be carried out reversibly (PHBA) or irreversibly.

The substrate is a material which can be selected from wood, metals, cements, plastics materials, textiles, leather.

In the case of a metal substrate, the metal can be, for example, aluminium or a steel.

It will be noted that the process is applicable to substrates which can have a plurality of superposed coatings and, in that case, the product of the invention can be used for the preparation of any one of those coatings. However, the product of the invention can be used for a finishing coating, which is the case especially with leather substrates.

Once the composition has been applied, the crosslinking reaction of the modified (poly)isocyanate of the composition can take place at ambient temperature or with heating at a temperature which can be from 30° C. to 300° C., preferably from 40° C. to 250° C. and yet more preferably from 50° C. to 150° C. The temperature and the crosslinking time are adapted in dependence on the substrate and in dependence on the crosslinking kinetics, which are themselves dependent on the reagents used. In the case of heat-sensitive substrates, crosslinking catalysts will more particularly be used.

The composition of the invention can also be used as an adhesive. In such a case, a coating is formed as described hereinbefore, the coating here having adhesive properties, on a substrate which is to be bonded to another element. The substrate can very particularly be a wood substrate.

Other details or advantages of the invention will become more clearly apparent from the examples given below.

EXAMPLES

Starting Materials

Jeffsol: glycerol carbonate, marketed by Huntsman and designated GC hereinbelow;

CAS No.: 931-40-8, MW=118.09 g/mol;

Other name: Glycerol Carbonate

Tolonate® HDT marketed by Rhodia:

Hexamethylene diisocyanate oligomers;

CAS No.: 28182-81-2

Vialkyd AN 903/70 EPAC marketed by Cytec:

70% by weight polyester resin in ethoxypropyl acetate (70EPAC). % OH (by weight) based on dry solid: approximately 4.4%.

Highsolv P marketed by Clariant:

Tetramethoxyethane, solvent designated HSP hereinbelow.

Stobicoat N873 marketed by Stockmeier:

Epoxy-amine systems.

Jeffamines marketed by Huntsman:

Jeffamine XTJ 582, CAS No.: 9046-10-0;

Polyoxypropylenediamine 60-100%

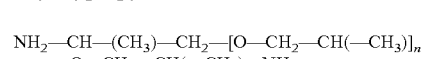

Jeffamine T-403, CAS No.: 39423-51-3
Polyoxypropylenetriamine; Mw=438.4 g/mol

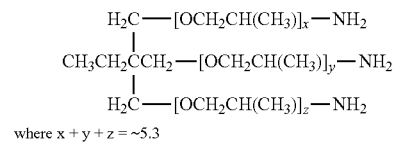

where x + y + z = ~5.3

Duroftal VPI 2803/78 BAC marketed by Cytec:
Polyester having hydroxylated functional groups, 78% by weight in butyl acetate; % OH (by weight)=~5.4%.
Vialkyd VAN 9460 marketed by Cytec:
Polyester having hydroxylated functional groups, 80% by weight in butyl acetate; % OH (by weight)=~4.3%.
Ancamides marketed by Airproducts;
  Ancamide 2353: Polyamidoamine resin;
  Ancamide 2426: Polyamidoamine resin.

Example 1

Synthesis of an HDT Polyisocyanate Hardening Agent Having Isocyanate Functions Masked by Glycerol Carbonate 404.2 g of Tolonate® HDT and 241.8 g of glycerol carbonate are introduced in succession into a one-liter double-walled reactor purged with argon.

50 ppm of dibutyltin dilaurate (DBTL) catalyst, based on the Tolonate® HDT, are added. The heating temperature is fixed at 90° C. After 5 minutes, the reaction is exothermic, reaching a temperature of 170° C. After cooling and maintaining the temperature of the mixture at about 120° C. for 40 minutes, the product is analyzed by infra-red spectroscopy. The NCO functional groups have disappeared, the resulting product is a polyisocyanate having substantially isocyanurate units, the NCO functional groups of which are blocked to the extent of 100% by glycerol carbonate. It is denoted HDT-GC.

Example 2

Study of the Solubility of Tolonate® HDT Having Isocyanate Functional Groups Masked by Glycerol Carbonate Approximately 2.5 g of pure HDT GC from Example 1 are weighed into 11 10 ml flasks.

Approximately 0.83 g of a solvent is then added to each flask in order to obtain products having a solids content of 75%. The flasks are closed. Each of the mixtures is heated at approximately 100° C. in order to melt the product, dissolve it in the solvent and observe its solubility. Once the product has melted, stirring is carried out for 5 minutes.

The following are evaluated visually:
the ease of mixing of the solvent and the product;
the solubility of the product in each solvent or any separation; and
the resulting viscosity.

The results are given in the summary table Table 1.

TABLE 1

| | 75% solids content | | |
|---|---|---|---|
| | Ease of mixing | Solubility | Viscosity |
| HighSolvP | Yes | Clear | Good |
| Toluene | No | Settles out | — |
| Solvesso 100 ® | No | Settles out | — |
| Xylene | No | Settles out | — |
| Butyl acetate | No | Cloudy | — |

Then, in order to study the solubility at a solids content of 50%, approximately 1.667 g of additional solvent are added, heating and stirring are carried out, and evaluation is made in the same manner as above.

The results are given in the summary table Table 2.

TABLE 2

| | 50% solids content | | |
|---|---|---|---|
| | Ease of mixing | Solubility | Viscosity |
| HighSolvP | Yes | Clear | Good |
| AMP | No | Settles out | — |
| Toluene | No | Settles out | — |
| Solvesso 100 | No | Settles out | — |
| Xylene | No | Settles out | — |
| Butyl acetate | No | Settles out | — |

Whatever the solids content, it is noted that Highsolv P permits good solubilization of the product of the reaction between Tolonate® HDT and glycerol carbonate, whereas the solvents conventionally used for solubilizing polyisocyanates are not suitable.

Example 3

Synthesis of HDT-GC at 75% by Weight in Highsolv P

A stream of argon is passed into a one-liter double-walled reactor, and there are then introduced, in succession:
402.5 g of Tolonate® HDT, the isocyanate (NCO) functional group content of which is 0.501 mol per 100 g, i.e. 21% by weight NCO functional groups per 100 g of product;
237.9 g of glycerol carbonate (Jeffsol GC) (2.01 mol); and
213.4 g of HighSolv P.

The molar ratio of NCO functional groups/OH functional groups is 1. The mixture is heated at 110° C. and regular checks are made by infra-red as to whether the isocyanate functional groups are still present in the mixture. After 18 hours, all the NCO functional groups have reacted (monitoring by infra-red) and the solids content of the final product is 75%.

Bands revealed on the infra-red spectrum:
presence of C=O carbonate at 1798 cm$^{-1}$,
presence of carbamate (NH at 3360 cm$^{-1}$, —C=O at 1700 cm$^{-1}$, —CONH at 1531 cm$^{-1}$ and at 1248 cm$^{-1}$),
presence of the isocyanurate ring (1468 cm$^{-1}$ and 1683 cm$^{-1}$).

Example 4

Synthesis of HDT GC Derivatives Grafted with Polyester Resins: HDT GC+Vialkyd AN903/70 EPAC The reaction is carried out in a one-liter double-walled reactor. After purging the reactor with a stream of argon, Tolonate® HDT (149.1 g, content of isocyanate (NCO) functional groups=0.515 mol per 100 g) and glycerol carbonate (82.23 g, Mw=118 g/mol, Jeffsol GC) are introduced in succession. 294.79 g of Highsolv P were then added in order to obtain a final product having a solids content of 50%. The temperature of the reaction mixture is fixed at 110° C. and the progress of the reaction between the isocyanate functional groups and the hydroxyl functional groups is monitored by infra-red.

After 5 hours' reaction at 110° C., a significant reduction in the peak corresponding to the NCO functional groups is noted, the majority of the hydroxyl functional groups of the glycerol carbonate having reacted. 42.3 g of Vialkyd AN903/70EPAC (Cytec, polyester resin, % OH=4.4%, 70% solids content) are added to the reaction mixture. The reaction is then continued for 2 hours at 110° C. until the isocyanate functional groups have disappeared completely (monitored by infra-red).

The final product will frequently be written HDT GC Vialkyd hereinbelow.

Example 5

Synthesis of HDT GC Derivatives Grafted with Polyester Resin: HDT GC+Vialkyd VAN 9460

The same process as in Example 4 was used in this example. The reactions were carried out in 30 ml Schott tubes.

As above, 85% of the molar ratio of the isocyanate functional groups are reacted with glycerol carbonate, and 15% of the isocyanate functional groups are reacted with each of the resins.

7.14 g of Tolonate® HDT and then 3.64 g of GC and finally 12.92 g of Highsolv P are introduced into a Schott tube.

The mixture is then heated and mixed at 110° C. for 8 hours before 2.68 g of Vialkyd VAN9460 are incorporated. Five hours after incorporating the polyester resin, 0.5 g of catalyst (0.1 g of DBTL, Fluka in 10 g of butyl acetate) is added in order to accelerate the reaction. The temperature was fixed at 80° C. and, after 1 hour, the NCO functional groups had reacted completely (monitored by infra-red).

Example 6

Synthesis of HDT GC Derivatives Grafted with Polyester Resin: HDT GC+Duroftal VPI 2803

The same process as in Example 4 was used in this example. The reactions were carried out in 30 ml Schott tubes.

As above, 85% of the molar ratio of the isocyanate functional groups are reacted with glycerol carbonate, and 15% of the isocyanate functional groups are reacted with each of the resins.

7.016 g of Tolonate® HDT and then 3.57 g of glycerol carbonate and finally 12.27 g of Highsolv P are introduced into a Schott tube.

The mixture is then heated and mixed at 110° C. for 8 hours before 2.15 g of Duroftal VPI 2803 are incorporated. After a period of 4¼ hours after introducing the polyester resin, 0.5 g of catalyst (0.1 g of DBTL, Fluka in 10 g of butyl acetate) is added in order to accelerate the reaction. The temperature is fixed at 80° C. and, after 1 hour, the NCO functional groups had reacted completely; see infra-red spectrum below.

Example 7

Preparation of HDT-GC Formulation Having a Solids Content of 50%

The syntheses of the HDT-GC of Example 3 yielded products at 75% in Highsolv P. In order to facilitate its use during application, the mixtures were diluted in Highsolv P in order to obtain a product having a solids content of 50%. The dilution carried out will be found in Table 3 below.

TABLE 3

| Sample | HDT GC 75% solvent | Solvent to be added (g) to obtain HDT GC 50% solvent |
|---|---|---|
| 1 | 104.9 g of HDT 75% Highsolv P | 52.5 g of Highsolv P |

Example 8

Preparation of Polyurethane Films

The polyurethane films are obtained by reacting various Jeffamines from Huntsman with the product of Example 4.

Different formulations are produced, one with a molar ratio cyclic carbonate functional groups/primary amine functional groups of 1/1 and the other with a molar ratio cyclic carbonate functional groups/primary amine functional groups of 1/1.2.

After preparing the mixture, the product is applied to a glass plate in a wet film thickness of 200 µm. The product is allowed to dry at ambient temperature.

The formulations are mentioned in Table 4.

TABLE 4

| Part A | Part B | Part A by weight | Part B by weight |
|---|---|---|---|
| HDT GC Vialkyd Example 4 | XTJ 582 | 10 g | 2.69 g |
| HDT GC Vialkyd Example 4 | Jefflink T403 | 10 g | 2 g |
| HDT GC Vialkyd Example 4 | XTJ 582 | 10 g | 3.23 g |
| HDT GC Vialkyd Example 4 | Jefflink T403 | 10 g | 2.4 g |

The appearance of the films is correct.

Example 9

Preparation of a Polyurethane Coating with Polyamidoamines (Ancamide)

Final product obtained in Example 4: HDT GC Vialkyd 50% HighSolv P;
Final product obtained in Example 7: HDT GC 50% HighSolv P;
Ancamide 2353 (Airproducts);
Ancamide 2426 (Airproducts).

The polyurethane films are obtained by reacting various polyamidoamines with different hardening agents having carbonate functional groups formulated in Highsolv P.

Different formulations are prepared, one with a molar ratio cyclic carbonate functional groups/primary amine functional groups of 1/1.

After preparing the mixture, the product is applied to a glass plate in a thickness of 200 µm (wet film). The product is allowed to dry at ambient temperature.

The appearance of the film is analyzed 48 hours after drying.

The results are given in Table 5 below.

TABLE 5

| Name part A | Name part B | Amount part B | Appearance of the film |
|---|---|---|---|
| Example 4 (5 g) | Ancamide 2353 | 1.39 g | Good |
| Example 4 (5 g) | Ancamide 2426 | 1.14 g | Good |
| Example 7 (5 g) | Ancamide 2353 | 1.83 g | Good |

Example 10

Preparation of an Epoxy Polyurethane Coating

A formulation constituted of 2 volumes of part A and 1 volume of part B is prepared. Part B is the commercial product Stobicoat N873 amine part. Part A is a mixture of commercial product Stobicoat N873 epoxy part and of formulation of the invention of Example 7 or 4.

The mixture is applied in a wet thickness of 200 μm and is allowed to dry at ambient temperature. The gloss measurements are made 7 days after application.

The results are given in Table 6 below.

TABLE 6

| System A | System B | Gloss at 20° | Gloss at 60° | Appearance of the film |
|---|---|---|---|---|
| Stobicoat N873 Epoxy part | Stobicoat N873 Amine part | 108 | 105 | Transparent correct |
| 60 g of Stobicoat N873 Epoxy part + 40 g of formulation of Example 7 (HDT GC 50% in Highsolv P) | Stobicoat N873 Amine part | 93 | 100 | Transparent correct |
| 60 g of Stobicoat N873 Epoxy part + 40 g of Example 4 (HDT GC Vialkyd AN903) | Stobicoat N873 Amine part | 106 | 104 | Transparent correct |

The resulting films allow correct films to be obtained with a gloss similar to the standard system. The addition of derivatives of the formulations of the invention of Examples 4 and 7 to the standard commercial epoxy system permits durability superior to that of the standard epoxy-amine systems not containing compounds of the invention.

Example 11

Preparation of an Epoxy Polyurethane Coating

A formulation constituted of 2 volumes of part A and 1 volume of part B is prepared.

Part B is the commercial product Stobicoat N873 amine part. Part A is a mixture of commercial product Stobicoat N873 epoxy part and of formulation of the invention of Example 5.

The mixture is applied in a wet thickness of 200 μm and is allowed to dry at ambient temperature. The gloss measurements are made 7 days after application.

The results are given in Table 7 below.

TABLE 6

| System A | System B | Ease of mixing | Film appearance | Gloss 60° |
|---|---|---|---|---|
| Stobicoat N873 Epoxy part | Stobicoat N873 Amine part | yes | good | 98.5 |
| 90 g of Stobicoat N873 Epoxy part + 10 g of formulation of Example 5 (HDT GC Vialkyd VAN 9460 50% HighSolvP) | Stobicoat N873 Amine part | yes | good | 101.5 |
| 60 g of Stobicoat N873 Epoxy part + 40 g of formulation of Example 5 (HDT GC + Vialkyd VAN 9460 50% HighSolv P) | Stobicoat N873 Amine part | yes | good | 101 |

The resulting films allow correct films to be obtained with a gloss similar to the standard system. The addition of derivatives of the formulations of the invention of Example 5 to the standard commercial epoxy system permits durability superior to that of the standard epoxy-amine systems not containing compounds of the invention.

The invention claimed is:

1. Composition based on modified (poly)isocyanate, comprising:

at least one modified (poly)isocyanate of formula (I) below:

$$\text{Iso-NH-CO-X-A} \underset{Y}{\overset{Z}{\diagdown}} \underset{O}{\diagup} \underset{O}{\diagdown} \underset{O}{\diagup}_{O} \quad (I)$$

wherein:
Iso is the residue of a (poly)isocyanate (after conversion of an isocyanate functional group);
X represents an atom or a group of atoms which has reacted with the isocyanate functional group;
A represents a single covalent bond or a linear, branched or cyclic hydrocarbon chain containing from 1 to 30;
Y represents a single covalent bond or a hydrocarbon chain as defined for A;
Z represents a single covalent bond or a hydrocarbon chain as defined for A;
with the proviso that the groups Z and Y do not simultaneously represent a bond;
A and Y, when one and/or the other does not represent a bond, can be joined by way of a divalent radical -Q-, wherein Q represents a linear, branched or cyclic hydrocarbon chain containing from 1 to 30 carbon atoms;
Y and Z, when one and/or the other does not represent a bond, can be joined by way of a divalent radical —W—, wherein W represents a linear, branched or cyclic hydrocarbon chain containing from 1 to 30 carbon atoms;
and
at least one solvent selected from:
a) a solvent of formula (II) below:

$$R_1-O\underset{R_1-O}{\overset{R_2}{\diagdown}}C\underset{R_4-R_3}{\overset{}{\diagup}}$$ (II)

wherein:

$R_1$ represents a linear or branched $C_1$-$C_4$-alkyl group, it being possible for the two radicals $R_1$ to be identical or different and also to be joined;

$R_2$ represents H or a linear or branched $C_1$-$C_4$-alkyl group;

$R_4$ represents a single covalent bond or a linear or branched hydrocarbon chain containing from 1 to 6 carbon atoms;

$R_3$ represents H, $C(OR_1)_2R_2$, $C(O)OR_1$, $OC(O)R_2$, $OC(O)OR_1$; and b) a solvent selected from the (cyclo)aliphatic ketones and the lactones.

2. Composition according to claim 1, wherein the solvent is a solvent of formula (II).

3. Composition according to claim 1, wherein —X— is selected from the following groups:

—O—;

—S—;

—N(R)—, wherein R represents a hydrogen atom or a hydrocarbon chain generally having from 1 to 12 atoms, which can contain one or more heteroatoms and can be substituted;

—R'⌒N—, wherein R' represents a hydrocarbon chain having from 1 to 12 atoms, which can contain one or more heteroatoms, chosen from the groups O, S, Si, or heterogroups chosen from the group —N═ and —NR—, and which can be substituted, the chain R' forming with N a nitrogenous, or polynitrogenous ring;

—CO—N(R)—;

—N(R)—C(O)O—;

—C(O)O—;

$$-\underset{\underset{COOR_5}{|}}{N}-$$

wherein $R_5$ represents a hydrocarbon radical having from 1 to 12 carbon atoms, which can contain one or more heteroatoms chosen from the groups O, S, Si, or heterogroups chosen from the groups —N═, —NR—, $$-O-\underset{\underset{OR}{|}}{\overset{\overset{O}{\|}}{P}}-O-,$$

$$-\underset{\underset{OR}{|}}{\overset{\overset{O}{\|}}{P}}-O-,$$

and

—NH—C(═O)—N(R)—.

4. Composition according to claim 1, wherein X represents an oxygen atom.

5. Composition according to claim 1, wherein A represents the group —CH$_2$—.

6. Composition according to claim 1, wherein Y represents the group —CH$_2$—.

7. Composition according to claim 1, wherein Z represents a bond or the group —CH$_2$—.

8. Composition according to claim 1, wherein A is not joined to Y and Z is not joined to Y.

9. Composition according to claim 1, wherein the modified (poly)isocyanate has the formula below:

Iso-NH—CO—O—CH$_2$—⟨cyclic carbonate⟩═O.

10. Composition according to claim 1, wherein the modified (poly)isocyanate further comprises at least one other free isocyanate functional group.

11. Composition according to claim 1, wherein the modified (poly)isocyanate is obtained from isocyanates selected from the following list:

diisocyanates, polyisocyanates containing at least one isocyanurate group, also called trimers, polyisocyanates containing at least one uretidinedione group, also called dimers, polyisocyanates containing at least one biuret group, polyisocyanates containing at least one carbamate group, polyisocyanates containing at least one allophanate group, polyisocyanates containing at least one ester group, polyisocyanates containing at least one amide group, polyisocyanates containing at least one urea functional group, polyisocyanates containing at least one iminocyclooxadiazinedione functional group, polyisocyanates containing at least one cyclooxadiazinetrione functional group, and polyisocyanates containing a combination of one or more groups which have just been mentioned.

12. Composition according to claim 1, wherein the modified (poly)isocyanate is obtained from hexamethylene diisocyanate.

13. Composition according to claim 1 wherein the modified (poly)isocyanate is obtained from a polyisocyanate selected from the homo- or hetero-condensation products of alkylene diisocyanate, comprising especially products of the "biuret" type or of the "trimer" type, comprising especially urea, urethane, allophanate, ester, amide, acylurea, isocyanurate, oxadiazinetrione, imino-dimer, imino-trimer (iminotriazinedione), imino-oxadiazinedione (also called asymmetric trimer), diazetidinedione (dimer) functional groups, and from mixtures containing them.

14. Composition according to claim 1 wherein the polyisocyanate is obtained from the homo- or hetero-condensation of the following aliphatic, (cyclo- or aryl-)aliphatic isocyanate monomers:
- 1,6-hexamethylene diisocyanate (HDI),
- 1,12-dodecane diisocyanate,
- cyclobutane-1,3-diisocyanate,
- cyclohexane-1,3- and/or -1,4-diisocyanate,
- isocyanato-3,3,5-trimethyl-5-diisocyanatomethylcyclohexane (isophorone diisocyanate, IPDI),
- the isocyanatomethyloctylene diisocyanates (TTI),
- 2,4- and/or 2,6-hexahydrotoluoylene diisocyanate ($H_6TDI$),
- hexahydro-1,3- and/or -1,4-phenylene diisocyanate,
- perhydro-2,4'- and/or -4,4'-diphenylmethane diisocyanate ($H_{12}MDI$), and generally the aminated aromatic precursors or perhydrogenated carbamates,
- the bis-isocyanatomethylcyclohexanes (especially 1,3 and 1,4) (BIC),
- the bis-isocyanatomethylnorbornanes (NBDI),
- 2-methylpentamethylene diisocyanate (MPDI),
- the tetramethylxylylene diisocyanates (TMXDI),
- derivatives of lysine di- or tri-isocyanate (LDI or LTI),
- 2,4- and/or 2,6-toluoylene diisocyanate,
- diphenylmethane-2,4'- and/or -4,4'-diisocyanate (MDI),
- 1,3- and/or 1,4-phenylene diisocyanate,
- triphenylmethane-4,4',4''-triisocyanate, and
- oligomers of MDI or TDI.

15. Composition according to claim 1, wherein the polyisocyanate is the product of the homocondensation of isocyanates selected from HDI and IPDI or is obtained from a mixture of those homocondensation products.

16. Composition according to claim 1, wherein, in the modified (poly)isocyanate, at least 50% of the isocyanate functional groups, advantageously at least 50% of the isocyanate functional groups are modified by a compound of the general formula (III):

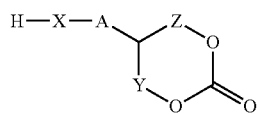
(III)

wherein X, A, Y and Z are as defined in claim 1.

17. Composition according to claim 1, wherein the solvent of formula (II) contains not more than 20 carbon atoms and in that it has a melting point of not more than 0° C. and a boiling point of not more than 350° C.

18. Composition according to claim 1, wherein in formula (II) of the solvent, $R_2$ represents H or $CH_3$, $R_4$ is a single covalent bond or a linear alkylene radical containing 1, 2 or 3 carbon atoms, and $R_3$ represents H, —(CH)(OR$_1$)$_2$ or —C(=O)(OR$_1$).

19. Composition according to claim 1, wherein in formula (II) of the solvent, the groups $R_1$ are methyl or ethyl radicals and are the same or different, $R_4$ is a single covalent bond or a methylene radical, $R_3$ represents H, —(CH)(OR$_1$)$_2$ or —C(=O)(OR$_1$) and $R_2$ represents hydrogen.

20. Composition according to claim 19, wherein the solvent of formula (II) is selected from 1,1,2,2-tetraethoxyethane, 1,1,2,2-tetramethoxyethane, methyl 2,2-dimethoxyacetate, ethyl 2,2-diethoxyacetate.

21. Composition according to claim 1, wherein it comprises from 5 to 75% by weight modified (poly)isocyanate, based on the weight of the composition.

22. Process for the preparation of the composition according to claim 1, comprising the following steps:
reacting an isocyanate, or a polyisocyanate and/or an isocyanate containing a group selected from the groups carbamate, urea, biuret, uretidinedione, isocyanurate, urethane and allophanate, with a compound of the general formula (III), and optionally with at least one polyol selected from the polyesters and/or polyethers, in the presence of the solvent of the general formula (II) and/or of the aliphatic ketone solvent and/or of the lactone solvent, and
optionally isolating the resulting product.

23. Process for the preparation of the composition according to claim 22, comprising a step of mixing at least one modified (poly)isocyanate with at least one solvent as defined in claim 1.

24. Composition comprising:
the compound of the general formula (III) as defined in claim 16;
at least one solvent selected from:
a) a solvent of formula (II) below:

(II)

wherein:
$R_1$ represents a linear or branched $C_1$-$C_4$-alkyl group, wherein the two radicals $R_1$ are identical or different and may be joined;
$R_2$ represents H or a linear or branched $C_1$-$C_4$-alkyl group;
$R_4$ represents a single covalent bond or a linear or branched hydrocarbon chain containing from 1 to 6 carbon atoms;
$R_3$ represents H, $CR_2(OR_1)_2$, $C(O)OR_1$, $OC(O)R_2$, $OC(O)OR_1$; and
b) a solvent selected from the (cyclo)aliphatic ketones and the lactones.

25. Non-expanded coating comprising a composition according to claim 1.

26. Non-expanded coating according to claim 25, wherein the non-expanded coatings is a paint, a varnish or an adhesive.

* * * * *